United States Patent
McAfee et al.

(10) Patent No.: US 8,799,982 B2
(45) Date of Patent: Aug. 5, 2014

(54) SYSTEM AND METHODS FOR EFFICIENTLY CLASSIFYING AND SELECTING AMONG SECURITY POLICY ALTERNATIVES FOR OUTBOUND NETWORK COMMUNICATIONS

(75) Inventors: Gary Owen McAfee, Raleigh, NC (US); John Majikes, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1604 days.

(21) Appl. No.: 12/022,936

(22) Filed: Jan. 30, 2008

(65) Prior Publication Data
US 2009/0193495 A1    Jul. 30, 2009

(51) Int. Cl.
*H04L 29/06*      (2006.01)

(52) U.S. Cl.
CPC ............... *H04L 63/20* (2013.01); *H04L 63/102* (2013.01)
USPC ................................................. 726/1; 726/10

(58) Field of Classification Search
None
See application file for complete search history.

(56) References Cited

U.S. PATENT DOCUMENTS

2007/0143851 A1*  6/2007  Nicodemus et al. ............ 726/25
2008/0059448 A1*  3/2008  Chang et al. ..................... 707/5

* cited by examiner

*Primary Examiner* — Kaveh Abrishamkar
(74) *Attorney, Agent, or Firm* — Novak Druce Connolly Bove + Quigg LLP (57) ABSTRACT

A computer-implemented method of selecting among a plurality of endpoint policy alternatives to apply to a message conveyed over a data communications network is provided. The method can include assigning a score to each of the plurality of endpoint policy alternatives, wherein an assigned score is based upon policy assertions of the endpoint policy alternative to which the score is assigned. The method can further include selecting, according to a predetermined selection criterion, one of the plurality of endpoint policy alternatives based upon the assigned scores.

15 Claims, 5 Drawing Sheets

| STATICALLY ASSIGNED POLICY ASSERTION WEIGHTS ||
|---|---|
| POLICY ASSERTION | ASSIGNED WEIGHT (FROM HIGHEST TO LOWEST) |
| TRANSPORT BINDING | 0x0200 |
| SYMMETRIC BINDING | 0x0100 |
| ASYMMETRIC BINDING | 0x0080 |
| ALGORITHM SUITE VALUE BASIC256RSA15 | 0x0040 |
| ALGORITHM SUITE VALUE BASIC192RSA15 | 0x0020 |
| ALGORITHM SUITE VALUE BASIC128RSA15 | 0x0010 |
| ALGORITHM SUITE VALUE TRIPLEDESRA15 | 0x0008 |
| INCLUDE TIMESTAMP = TRUE | 0x0004 |
| PROTECT TOKENS = TRUE | 0x0002 |
| ENCRYPT SIGNATURE = TRUE | 0x0001 |

FIG. 3

| ENDPOINT POLICY ALTERNATIVE | WEIGHTS | |
|---|---|---|
| | ASSERTION WEIGHT | CUMULATIVE WEIGHT |
| 1. ENDPOINT POLICY ALTERNATIVE #1 | | 0x0244 = 580 |
|    TRANSPORT BINDING | 0x0200 | |
|    ALGORITHM SUITE VALUE BASIC256RSA15 | 0x0040 | |
|    INCLUDE TIMESTAMP = TRUE | 0x0004 | |
|    PROTECT TOKENS = N/A | | |
|    ENCRYPT SIGNATRE = N/A | | |
| 2. ENDPOINT POLICY ALTERNATIVE #2 | | 0x0240 = 576 |
|    TRANSPORT BINDING | 0x200 | |
|    ALGORITHM SUITE VALUE BASIC256RSA15 | 0x040 | |
|    INCLUDE TIMESTAMP = FALSE | | |
|    PROTECT TOKENS = N/A | | |
|    ENCRYPT SIGNATRE = N/A | | |
| 3. ENDPOINT POLICY ALTERNATIVE #3 | | 0x00C7 = 199 |
|    ASYMMETRIC BINDING | 0x0080 | |
|    ALGORITHM SUITE VALUE BASIC256RSA15 | 0x0040 | |
|    INCLUDE TIMESTAMP = TRUE | 0x0004 | |
|    PROTECT TOKENS = TRUE | 0x0002 | |
|    ENCRYPT SIGNATRE = TRUE | 0x0001 | |
| 4. ENDPOINT POLICY ALTERNATIVE #4 | | 0x00A4 = 164 |
|    ASYMMETRIC BINDING | 0x0080 | |
|    ALGORITHM SUITE VALUE BASIC19RSA15 | 0x0020 | |
|    INCLUDE TIMESTAMP = TRUE | 0x0004 | |
|    PROTECT TOKENS = FALSE | | |
|    ENCRYPT SIGNATRE = FALSE | | |

SYSTEM AND METHODS FOR EFFICIENTLY CLASSIFYING AND SELECTING AMONG SECURITY POLICY ALTERNATIVES FOR OUTBOUND NETWORK COMMUNICATIONS

FIELD OF THE INVENTION

The present invention is related to the field of data communications, and more particularly, to systems and methods for protecting the confidentiality and authenticity of network-based data communications.

BACKGROUND OF THE INVENTION

It is often desirable to protect the confidentiality and authenticity of data conveyed in Web Service requests and responses. Confidentiality pertains to assurances that data received is exactly as sent by an authorized entity (i.e., that the received data has not been modified is some manner). Authentication pertains to assurances that the communicating entity is in fact the one that the entity claims to be. One approach for protecting the confidentiality and authenticity of data is to specify one or more sets of security policies that are applied to message that is to be conveyed over a data communications network, such as the Internet.

An example of this approach to protecting the confidentiality and authenticity of data is reflected in the standard developed by the Organization for the Advancement of Structured Information Standards (OASIS), the OASIS specification, WS-Security Policy 1.2. WS-Security Policy 1.2 describes a set of security policies that can be applied to a Simple Object Access Protocol (SOAP) message. The security policies provide a mechanism by which system and network administrators can specify generally the level and type of security required for particular Web Services provided and requested. Typically, however, more than one set of security policies can apply to a particular SOAP message because a given Web Services requester or provider has the potential to communicate with a variety of different endpoints, each with its own sets of security policies, and because there typically is more than one set of security policies that can apply to each SOAP message.

SW-Security Policy 1.2 describes three security policy "attachments" that have differing scopes that can be applied to any particular SOAP message. These security policy attachments are Endpoint Policy, Message Policy, and Operation Policy. Several combinations of security policies from the attachments can be applied to any given SOAP message. An Endpoint Policy, however, alternative must be used for each SOAP message. Each of these security policies is expressed in the Extensible Markup Language (XML), a general-purpose markup language that allows users to define their own objects and elements.

Endpoint Policy alternatives contain nested policy assertions. Though not all nested assertions are applicable to each Security Binding Assertion, some of the Endpoint Policy assertions that are of interest in the present context and that follow a nested format are: Security Binding Asertions (either Transport Binding, Symmetric Binding, Asymmetric Binding), describing whether Transport Layer Security (TLS)/Secure Sockets Layer (SSL), symmetric keys, or asymmetric key pairs will be used; AlgorithmSuite, specifying the cryptographic algorithm to use when applying encryption or producing digital signatures (there are various cryptographic algorithms that differ based upon the actual encryption and signature algorithm as well as strength of the key); IncludeTimestamp, a boolean indicator indicating whether to include a time stamp within the message to assist in protecting against replay attacks; Encryptsignature, a boolean indicator indicating whether to encrypt the main signature in the message; and ProtectTokens, indicating whether the tokens used to produce a signature are covered by a given signature.

An endpoint policy attachment (or scope), such as one specified by SW-Security Policy 1.2, typically varies to the greatest extent from location to location (e.g., from one Web Service provider to another), as it does not depend upon the content of the message body. Rather, to a considerable degree, it depends upon security decisions made by a Web Services administrator and upon the specific services requested by or provided by the particular system. An SW-Security Policy 1.2 Endpoint Policy alternative used to build a SOAP message, for example, must have a compatible Endpoint Policy alternative on the receiving endpoint. Thus, there can be multiple Endpoint Policy alternatives to choose from when building a SOAP message and when receiving a SOAP message so as to accommodate the differences.

As yet, however, there is not an effective and efficient mechanism for choosing among different endpoint policy alternatives such as those specified by SW-Security Policy 1.2. Nonetheless, efficiently choosing a particular endpoint policy alternative is important, especially in the Web Services arena since many Web Services implementations incur considerable overhead in parsing the message XML and in applying the cryptographic operations needed to protect the message. Efficiencies of any and all types are desirable so as to reduce process type and central processing unit (CPU) cycles, for example. Thus, there is a need for an effective mechanism for choosing among different Endpoint Policy alternatives.

SUMMARY OF THE INVENTION

The present invention is directed to systems, a computer product, and related methods for classifying each of a plurality endpoint policy alternatives and efficiently selecting which among the different alternatives to utilize so as to provide Web Services security when a requestor or provider builds a message that is to be conveyed over a data communications network.

One embodiment of the invention is a computer-based system for selecting among a plurality of endpoint policy alternatives to apply to a message conveyed over a data communications network. The system can include at least one processor for processing processor-executable instructions. Additionally, the system can include a score-assigning module configured to execute on the one or more processors for causing the one or more processors to assign a score to each of the plurality of endpoint policy alternatives. An assigned score, more particularly, can be based upon policy assertions of the endpoint policy alternative to which the score is assigned. The system further can include an alternative-selecting module configured to execute on the one or more processors for causing the one or more processors to select, according to a predetermined selection criterion, one of the plurality of endpoint policy alternatives based upon the assigned scores.

Another embodiment of the invention is a computer-implemented method of selecting among a plurality of endpoint policy alternatives to apply to a message conveyed over a data communications network. The method can include assigning a score to each of the plurality of endpoint policy alternatives, an assigned score being based upon policy assertions of the endpoint policy alternative to which the score is assigned. The method further can include selecting, according to a predetermined selection criterion, one of the plurality of endpoint policy alternatives based upon the assigned scores.

Still another embodiment of the invention is a computer-readable storage medium comprising computer-executable instructions. The instructions can operate to cause the computer to select among a plurality of endpoint policy alternatives to apply to a message conveyed over a data communications network by performing the steps of: assigning a score to each of the plurality of endpoint policy alternatives, wherein an assigned score is based upon policy assertions of the endpoint policy alternative to which the score is assigned; and selecting according to a predetermined selection criterion one of the plurality of endpoint policy alternatives based upon the assigned scores.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
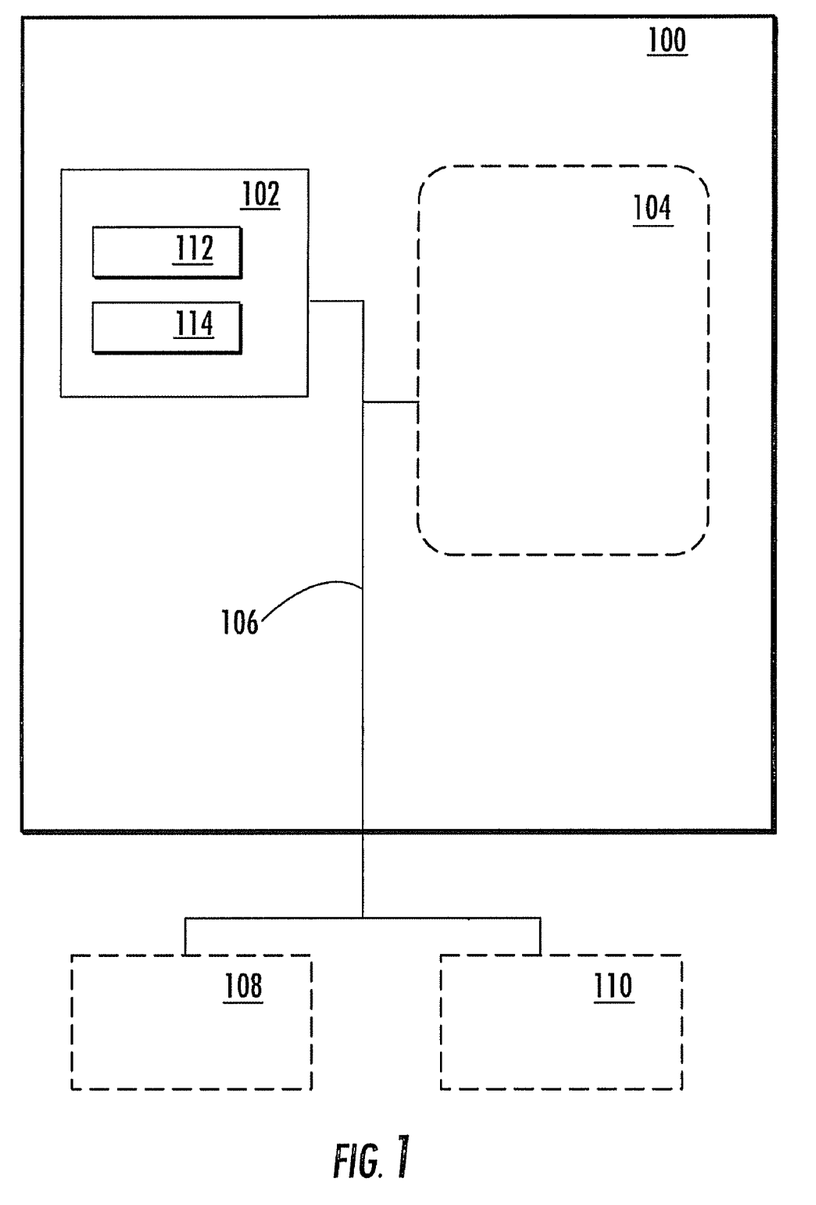
FIG. 1 is a schematic view of a system for classifying endpoint policy alternatives and efficiently selecting one alternative for a network-conveyed message, according to one embodiment of the invention.

FIG. 1 is a schematic view of a system 100 for classifying endpoint policy alternatives and efficiently selecting one alternative for a communication or message, such as a SOAP message, that is conveyed over a data communications network, such as the Internet. The system 100 illustratively comprises a computing device, such as a general-purpose or application-specific computer, having one or more processors 102. The system 100 optionally can include an electronic memory 104 communicatively linked to the one or more processors by a bus 106. Additionally, the system can optionally include one or more input/output (I/O) systems or devices 108 and/or external, or secondary, memory 110.

The one or more processors 102 can comprise data registers, logic gates, and other logic-based circuitry (not explicitly shown) for processing processor-executable instructions. The processor-executable instructions, as well as electronic data, can be stored in the memory 104 and conveyed via the bus 108 to the one or more processors for processing. More particularly, the system 100 can comprise a network-connected device for conveying over a data communications network, such as the Internet, request or response messages, such as SOAP messages.

The system 100 further illustratively includes a score-assigning module 112 and an alternative-selecting module 114 both configured to execute on the one or more processors 102 and to cooperatively perform the procedures and functions described herein. Accordingly, one or both of the score-assigning module 112 and the alternative-selecting module 114 can be implemented in processor-executable code. Alternately, however, one or both of the score-assigning module 112 and the alternative-selecting module 114 can be implemented in dedicated hardwired circuitry for carrying out the same procedures and functions. In yet another embodiment one or both modules 112, 114 can be implemented in a combination of code and hardwired circuitry.

Figure 2:
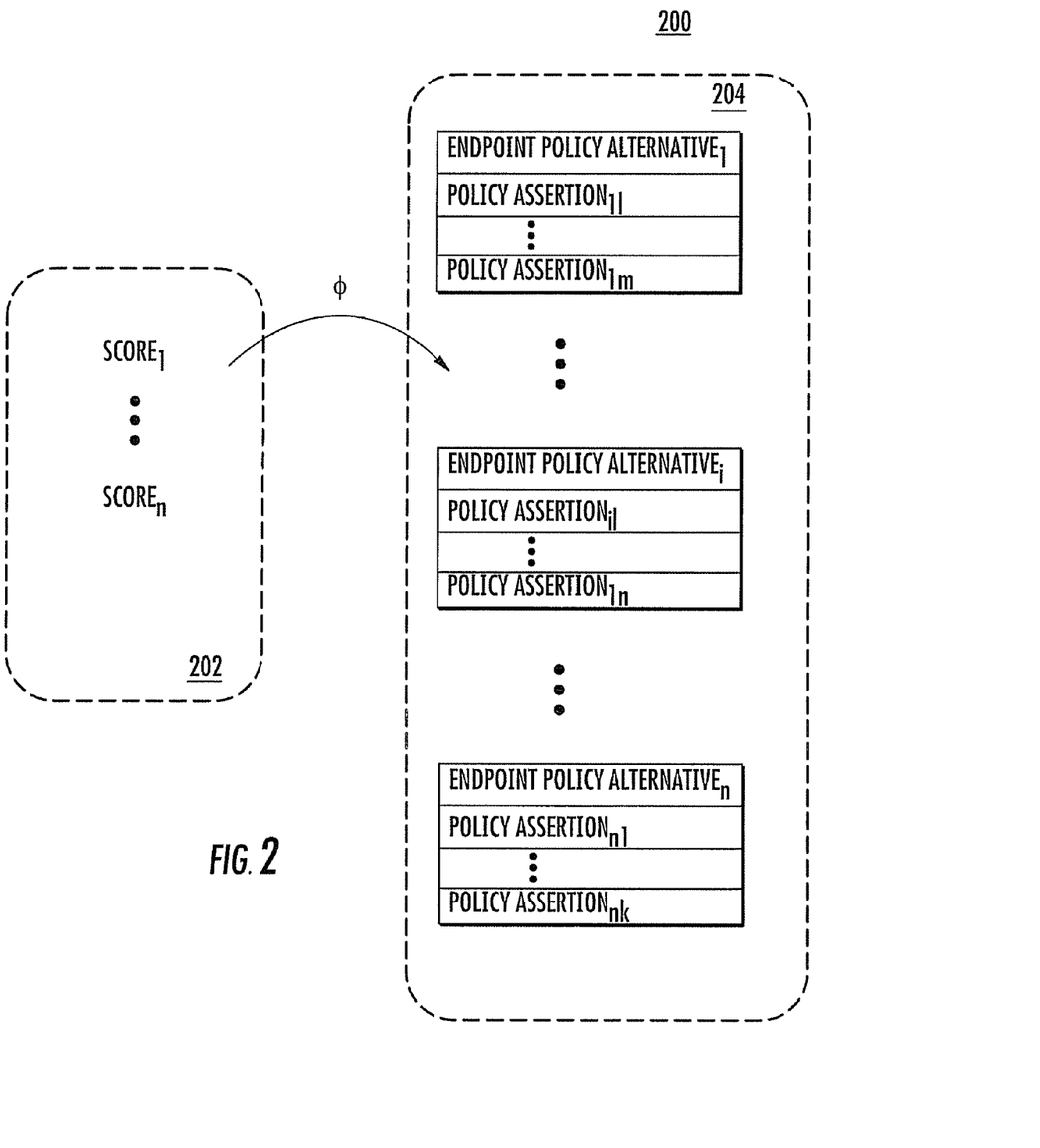
FIG. 2 is a schematic representation of certain operative procedures performed by the system shown in FIG. 1.

Referring additionally to FIG. 2, certain operative features 200 of the system 100 are schematically represented. Operatively, the score-assigning module 112 is configured to execute on the one or more processors 102 so as to cause the one or more processors to assign scores 202 to each of a plurality of endpoint policy alternatives 204. A particular score, $S_i$, i=1, ..., n, that is assigned to a particular one of the endpoint policy alternatives 204 can be an ordinal number or other quantitative measure that ranks each endpoint policy alternative relative to each of the other endpoint policy alternatives 204. Thus, each score can be computed according to a defined function $\phi$ that maps individual scores 202 to individual endpoint policy alternatives 204.

Each of the endpoint policy alternatives 204, Endpoint Policy alternatives, j=1, ..., n, contains one or more policy assertions. The policy assertions, moreover, can comprise nested policy assertions. For example, as already noted in the specific context of SOAP messages, these endpoint policy assertions can include one or more of the following assertions: Security Binding Asertions (either Transport Binding, Symmetric Binding, Asymmetric Binding), that describe whether Transport Layer Security (TLS)/Secure Sockets Layer (SSL), symmetric keys, or asymmetric key pairs will be used; AlgorithmSuite, specifying the cryptographic algorithm to use when applying encryption or producing digital signatures; IncludeTimestamp, a boolean indicator indicating whether to include a time stamp within the message to assist in protecting against replay attacks; Encryptsignature, a boolean indicator indicating whether to encrypt the main signature in the message; and ProtectTokens, indicating whether the tokens used to produce a signature are covered by a given signature.

According to the invention, each score $S_i$, i=1, ..., n, is determined based upon the particular policy assertions of the endpoint policy alternative to which the score is assigned. Once a score has been so determined, the alternative-selecting module 114 is configured to execute on the one or more processors 102 so as to cause the one or more processors 102 to select, according to a predetermined selection criterion, one of the plurality of endpoint policy alternatives 204 based upon the assigned scores, $S_i$, i=1, ..., n.

According to one embodiment, the score-assigning module 112 is configured to assign each of the policy assertions of each endpoint policy alternative a predefined weight and to cause the one or more processors 102 to assign a score to each endpoint policy alternative by determining the predefined weights assigned to the policy assertions of the endpoint policy alternative to which the score is assigned. More particularly, the score-assigning module 112 can be configured to cause the one or more processors 102 to compute the score assigned to the endpoint policy alternative based upon a summation of the predefined weights assigned to each policy assertion of the endpoint policy alternative.

Thus the weight applied to the assertions can be summed to arrive at an overall score for the particular policy alternative. A higher, or alternatively, a lower score can indicate that the endpoint policy alternative assigned the score is more desirable. As long as the rule maintains a consistent ordering of the endpoint policy alternatives any manner of scoring can be used. The score-assigning module 112 can be further configured to generate a table, such as a statically-defined table, which maps each policy assertion to its assigned weight.

According to one embodiment the invention, weights can be assigned or applied to policy assertions in accordance with different objectives. Thus, the system 100 affords considerable flexibility for effecting different policy or goals. For example, in the context of a SOAP message, it can be advantageous to utilize the most secure method of transporting the SOAP message over the data communications network from end-to-end, and to treat efficiency as only a secondary consideration. However, in different contexts, the priority of security over efficiency could be reversed. Indeed, totally different factors besides security or efficiency can be considered important in still other contexts. Nonetheless, the flexibility of the system 100 permits the differing priorities to be expressed by the assignment of different weights to different policy assertions depending on the particular context.

The endpoint policy alternatives 204 can be expressed in the extensible markup language (XML). Thus, the score-assigning module 112 can be configured to cause the one or more processors 102 to parse the endpoint policy alternatives to discover the policy assertions of each endpoint policy alternative. Accordingly, as the various policy assertions of interest are discovered, the score-assigning module 112 can be configured to cause the one or more processors 102 to determine the predefined weights, if any, assigned to the policy assertions of each endpoint policy alternative. The determination can be effected by performing a table look-up procedure so as to determine the predefined weights assigned, if any, to each of the policy assertions. The score-assigning module 112 can be configured to cause the one or more processors 102 to add the weight for a particular assertion to a cumulative score for a corresponding endpoint policy alternative. Accordingly, the cumulative score can be associated with the corresponding endpoint policy alternative.

Moreover, as endpoint policy alternatives are created by, for example, a system administrator, the score-assigning module 112 can be configured to cause the one or more processors 102 to parse the endpoint policy alternatives and assign scores. The scores can then be added to an existing mapping that maps policy alternatives to their scores. The resulting table can then be automatically sorted according to the scores to make references to the table rapid and efficient.

According to still another embodiment, each predefined weight used by the system 100 can be represented by a bit sequence that distinguishes each policy assertion to which the bit sequence is assigned from each of the other policy assertions. When a Web services requestor or provider utilizing the system 100 needs to apply a security policy to an outbound messages, such as a SOAP message, the requestor or provider may be constrained by decisions already made pertaining to certain aspects of security that need to be applied. For example, if it has been determined that the SOAP message is to be sent over a TLS/SSL connection, then only endpoint policy alternatives that contain a Transport binding assertion are appropriate. With the weights assigned to policy alternatives being represented as unique bits that distinguish each policy assertion from the other policy assertions, then selecting an endpoint policy alternative that has a compatible policy assertion can be performed by applying a bit mask for that assertion to the cumulative scores. Thus, the system 100 determines which of the endpoint policy alternatives contain a Transport type of security binding assertion. Then, among those endpoint policy alternatives that meet the prior constraint or constraints, the one whose score is highest can be chosen so as to apply security to the outbound message. In the event of tie, the decision as to which endpoint policy alternative to apply can be made arbitrarily by, for example, using a random number generator optionally added to the system 100.

Thus, when each score assigned to each endpoint policy alternative comprises a cumulative score computed by summing the predefined weights of the policy assertions of the endpoint policy alternative to which each score is assigned, the score-assigning module 112 can be configured to cause the one or more processors 102 to select one of the plurality of endpoint policy alternatives based upon the assigned scores by logically OR-ing a bit mask with each of the assigned scores. The bit mask, more particularly, can correspond to a specified endpoint policy alternative.

Figure 3:
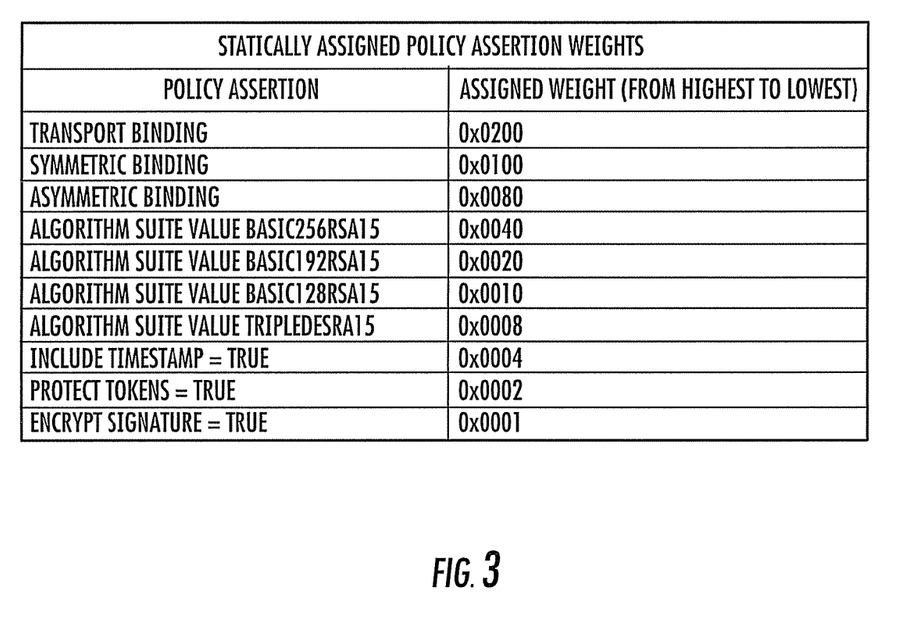
FIG. 3 is an exemplary table of statically-assigned policy assertion weights that can be used, according to one embodiment, by the system shown in FIG. 1.

FIG. 3 is an exemplary table of statically-assigned policy assertion weights, each of the weights being expressed as powers of two (shown in hexadecimal notation from highest to lowest). Each weight assigned, moreover, is represented by a unique bit sequence. It is, solely for the sake of clear exposition, assumed that the encryption and signature algorithms supported are limited to the four shown in the table.

Figure 4:
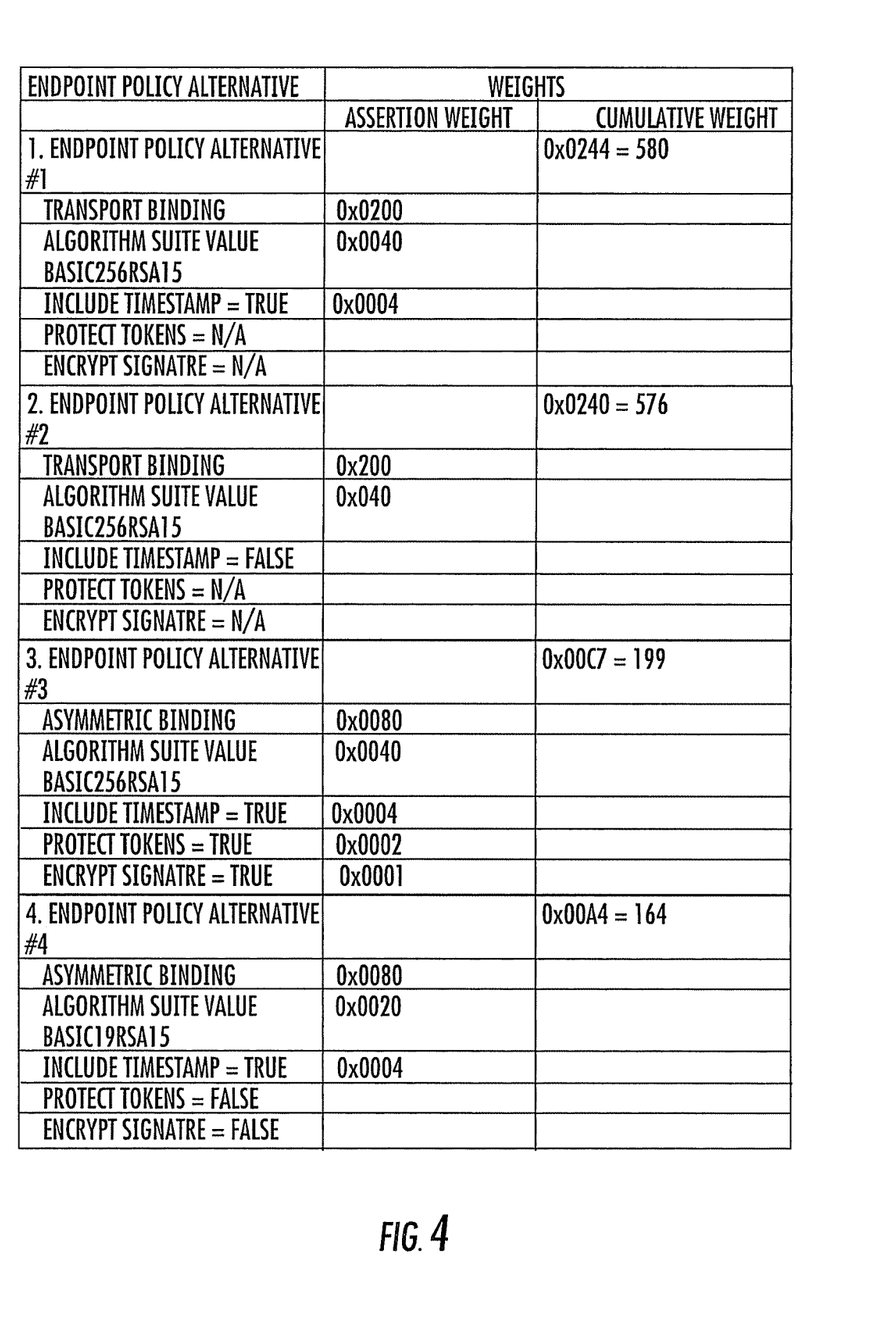
FIG. 4 is an exemplary table of endpoint policy alternatives that can be used, according to one embodiment, by the system shown in FIG. 1.

FIG. 4 is an exemplary table comprising four distinct endpoint policy alternatives, each shown with its corresponding policy assertions assigned the weights as in FIG. 3. The endpoint policy alternatives are pre-sorted according to their cumulative weight (i.e., score).

Operatively, assuming no prior constraints upon which endpoint policy alternative can be chosen, the first entry of the table in FIG. 4 is selected, given that the cumulative weights are listed from highest to lowest going down the table. Had the cumulative weights not been pre-sorted, it would be necessary to determine the policy alternative having the highest cumulative weight. Alternatively, if there were imposed prior constraints upon which endpoint policy alternative could be chosen then the algorithm to select the endpoint policy alternative to use for an outbound SOAP message is altered to take this constraint into account. For example, if the endpoint of the network dictates that the message will not flow on an SSL/TLS connection, then only endpoint policy alternatives that do not contain a Transport Binding are suitable for the security of the outbound SOAP message. Using a bit mask of 0x0200 (for Transport Binding assertion, the cumulative weight can be logically OR-ed with the bit mask and if the result is zero, then the policy alternative is suitable for the message. Starting from the highest weighted policy alternative at the top of the table and proceeding downward through the table, the logical OR operation does not provide a nonzero result until the third endpoint policy alternative is reached. Since the policy alternatives are sorted according to cumulative weight (based upon weights assigned to the individual policy assertions), the first such policy alternative that provides a nonzero result is chosen as the best suited for the outbound SOAP message.

When policy assertions are assigned a unique bit (power of two) for their respective weights, it follows that no set of assertions with a lower (not even the sum of all assertions with a lower weight) can have a higher cumulative weight than the endpoint policy alternative with an assertion containing the higher weight. This result, however, may not be desirable in certain contexts. For example, an endpoint policy alternative with its lowest weighted assertion being eight always has a higher cumulative weight (or score) than does an endpoint policy alternative that has its highest weighted assertion being four, even when it also contains all remaining lower weighted assertions of two and one (i.e., 8>4+2+1=7). If this result is unacceptable for a particular implementation then the assertions can be assigned weights that are not powers of two, such that in certain circumstances a combination of assertions with lower weights may well result in a cumulative weight higher than an endpoint policy alternative with an assertion having a weight higher than any cumulative weight of its competing endpoint policy alternative. For example, an endpoint policy alternative with a cumulative weight of eight due to one assertion may have a lower cumulative weight than another endpoint policy alternative containing a number of lower weight assertions, such as five, three, and two. One drawback, however, is that this approach precludes rapid elimination of endpoint policy alternatives by applying a bit mask to satisfy prior constraints.

Figure 5:
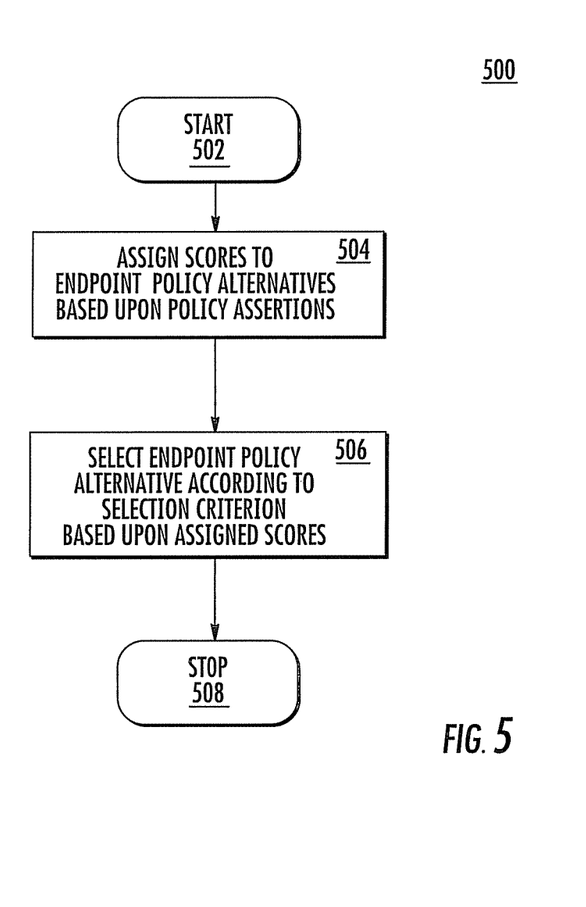
FIG. 5 is a flowchart of exemplary steps in a method for classifying endpoint policy alternatives and efficiently selecting one alternative for a network-conveyed message, according another embodiment of the invention.

Referring now to FIG. 5, a flowchart is provided which illustrates exemplary steps in a method 500 selecting among a plurality of endpoint policy alternatives to apply to a message conveyed over a data communications network, according to yet another embodiment of the invention. The method 500 includes, after the start at step 502, assigning a score to each of the plurality of endpoint policy alternatives at step 504. More particularly, an assigned score is based upon policy assertions of the endpoint policy alternative to which the score is assigned. The method 500 continues at step 506 by selecting, according to a predetermined selection criterion, one of the plurality of endpoint policy alternatives based upon the assigned scores. The method 500 illustratively concludes at step 508.

It is expressly noted that the method steps 500 need not occur in any particular sequence. Indeed, in a typical application, the step 504 of assigning a score need only be undertaken periodically, corresponding to invoking the score-assigning module in the above-described system. The step 506 of selecting, according to a predetermined selection criterion, an endpoint policy alternative based upon the assigned scores, however, can be undertaken for each outbound message. Thus, in the context of the above-described system, the alternative-selecting module could be invoked for each outbound message, whereas the score-assigning module typically need only be invoked during system initialization (e.g., when a system-administrator-defined set of endpoint policy alternatives are read in) or when a system administrator dynamically adds/changes/deletes new endpoint policy alternative definitions to the system. The method and system, accordingly, can enhance considerably the efficiency of classifying and selecting among endpoint policy alternatives for outbound network communications.

According to one embodiment, each of the policy assertions of each endpoint policy alternative can be assigned a predefined weight. Accordingly, the step 504 of assigning a score to each endpoint policy alternative can comprise determining the predefined weights assigned to the policy assertions of the endpoint policy alternative to which the score is assigned. The step 504 of assigning a score to each individual endpoint policy alternative, moreover, can comprise summing the predefined weights assigned to each policy assertion of each individual endpoint policy alternative.

According to another embodiment, the endpoint policy alternatives can be expressed in the extensible markup language (XML). Accordingly, the method 500 can further include parsing the endpoint policy alternatives to discover the policy assertions of each endpoint policy alternative. The step of determining the predefined weights assigned to the policy assertions of each endpoint policy alternative, more particularly, can comprise performing a table look-up procedure to determine the predefined weights assigned to each of the policy assertions.

According to yet another embodiment, each predefined weight can be represented by a bit sequence that distinguishes each policy assertion to which the bit sequence is assigned from each of the other policy assertions. Moreover, each score assigned to each endpoint policy alternative can comprise a cumulative weight or score computed by summing the predefined weights of the policy assertions of the endpoint policy alternative to which each score is assigned. Accordingly, selecting one of the plurality of endpoint policy alternatives based upon the assigned scores can comprise logically ORing a bit mask with each of the assigned scores. The bit mask can correspond to a specified policy alternative.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented method of selecting among a plurality of endpoint policy alternatives to apply to a message conveyed over a data communications network, the method comprising:
    configuring a computer system having at least one memory and at least one processor to perform the following steps:
        assigning a score to each of the plurality of endpoint policy alternatives, each of the plurality of endpoint policy alternatives comprising a plurality of policy assertions, and the score being a sum of predefined weights assigned to each of the plurality of policy assertions, wherein each predefined weight is represented by a unique bit sequence that distinguishes each of the plurality of policy assertions to which the unique bit sequence is assigned from each of the other of the plurality of policy assertions; and
        selecting according to a predetermined selection criterion one of the plurality of endpoint policy alternatives based upon the assigned scores.

2. The method of claim 1, wherein assigning a score to each endpoint policy alternative comprises determining the predefined weights assigned to each of the plurality of policy assertions plurality of the endpoint policy alternatives.

3. The method of claim 2, wherein the endpoint policy alternatives are expressed in an extensible markup language (XML), and further comprising parsing the plurality of endpoint policy alternatives to discover the policy assertions of each of the plurality of endpoint policy alternatives.

4. The method of claim 3, wherein determining the predefined weights assigned to the plurality of policy assertions of each of the plurality of endpoint policy alternatives comprises performing a table look-up procedure to determine the predefined weights assigned to each of the plurality of policy assertions.

5. The method of claim 1, wherein selecting one of the plurality of endpoint policy alternatives based upon the assigned scores comprises logically OR-ing a bit mask with each of the assigned scores, the bit mask corresponding to specified policy alternative.

6. A computer-based system for selecting among a plurality of endpoint policy alternatives to apply to a message conveyed over a data communications network, the system comprising:
- at least one processor for processing processor-executable instructions;
- a score-assigning module configured to execute on the at least one processor for causing the at least one processor to assign a score to each of the plurality of endpoint policy alternatives, each of the plurality of endpoint policy alternatives comprising a plurality of policy assertions, and the score being a sum of predefined weights assigned to each of the plurality of policy assertions, wherein each redefined weight is represented by a unique bit sequence that distinguishes each of the plurality of policy assertions to which the unique bit sequence is assigned from each of the other of the plurality of policy assertions; and
- an alternative-selecting module configured to execute on the at east one processor for causing the at least one processor to select, according to a predetermined selection criterion, one of the plurality of endpoint policy alternatives based upon the assigned scores.

7. The system of claim 6, wherein the score-assigning module is configured to cause the at least one processor to assign a score to each endpoint policy alternative by determining the predefined weights assigned to each of the plurality of policy assertions plurality of the endpoint policy alternatives.

8. The system of claim 7, wherein the endpoint policy alternatives are expressed in an extensible markup language (XML), and wherein the score-assigning module is configured to cause the at least one processor to parse the plurality of endpoint policy alternatives to discover the policy assertions of each of the plurality of endpoint policy alternatives.

9. The system of claim 8, wherein the score-assigning module is configured to cause the at least one processor to determine the predefined weights assigned to the plurality of policy assertions of each of the plurality of endpoint policy alternatives comprises performing a table look-up procedure to determine the predefined weights assigned to each of the plurality of policy assertions.

10. The method of claim 6, wherein the score-assigning module is configured to cause the at least one processor to select one of the plurality of endpoint policy alternatives based upon the assigned scores by logically OR-ing a bit mask with each of the assigned scores, the bit mask corresponding to specified policy alternative.

11. A non-transitory computer-readable storage comprising computer-executable instructions for causing the computer to select among a plurality of endpoint policy alternatives to apply to a message conveyed over a data communications network by performing the steps of:
- assigning a score to each of the plurality of endpoint policy alternatives, each of the plurality of endpoint policy alternatives comprising a plurality of policy assertions, and the score being a sum of predefined weights assigned to each of the plurality of policy assertions, wherein each predefined weight is represented by a unique bit sequence that distinguishes each of the plurality of policy assertions to which the unique bit sequence is assigned from each of the other of the plurality of policy assertions; and
- selecting according to a predetermined selection criterion one of the plurality of endpoint policy alternatives based upon the assigned scores.

12. The non-transitory computer-readable storage of claim 11, wherein assigning a score to each endpoint policy alternative comprises determining the predefined weights assigned to each of the plurality of policy assertions plurality of the endpoint policy alternatives.

13. The non-transitory computer-readable storage of claim 12, wherein the endpoint policy alternatives are expressed in an extensible markup language (XML), and further comprising parsing the plurality of endpoint policy alternatives to discover the policy assertions of each of the plurality of endpoint policy alternatives.

14. The non-transitory computer-readable storage of claim 13, wherein determining the predefined weights assigned to the plurality of policy assertions of each of the plurality of endpoint policy alternatives comprises performing a table look-up procedure to determine the predefined weights assigned to each of the plurality of policy assertions.

15. The non-transitory computer-readable storage of claim 11, wherein selecting one of the plurality of endpoint policy alternatives based upon the assigned scores comprises logically OR-ing a bit mask with each of the assigned scores, the bit mask corresponding to specified policy alternative.

* * * * *